US008127122B2

(12) United States Patent
Barry et al.

(10) Patent No.: US 8,127,122 B2

(45) Date of Patent: Feb. 28, 2012

(54) SELECTION OF BOOT DRIVE IN A COMPUTER SYSTEM

(75) Inventors: Timothy G. Barry, Fort Collins, CO (US); Harry Möeller, Munich (DE); Vladimir Hrabrov, Fair Lawn, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 12/211,202

(22) Filed: Sep. 16, 2008

(65) Prior Publication Data

US 2010/0070744 A1 Mar. 18, 2010

(51) Int. Cl.
*G06F 15/177* (2006.01)

(52) U.S. Cl. ................................................ 713/1; 713/2

(58) Field of Classification Search ................... 713/2, 1
See application file for complete search history.

(56) References Cited

U.S. PATENT DOCUMENTS

| | | | | |
|---|---|---|---|---|
| 6,115,815 | A | 9/2000 | Doragh et al. | |
| 6,202,121 | B1 * | 3/2001 | Walsh et al. | 711/100 |
| 6,282,641 | B1 | 8/2001 | Christensen | |
| 6,289,426 | B1 | 9/2001 | Maffezzoni et al. | |
| 6,532,535 | B1 | 3/2003 | Maffezzoni et al. | |
| 6,684,326 | B1 * | 1/2004 | Cromer et al. | 713/2 |
| 6,754,818 | B1 * | 6/2004 | Lee et al. | 713/2 |
| 7,370,190 | B2 * | 5/2008 | Calhoon et al. | 713/2 |
| 7,519,806 | B2 * | 4/2009 | Stutton et al. | 713/2 |
| 2003/0084307 | A1 | 5/2003 | Schwartz | |
| 2003/0084316 | A1 * | 5/2003 | Schwartz | 713/200 |
| 2005/0021934 | A1 * | 1/2005 | Dong et al. | 713/1 |

* cited by examiner

*Primary Examiner* — Chun Cao

(57) ABSTRACT

A boot drive of a computing system is identified during at least two runtime environment of the computer system. The computer system includes at least two storage devices. An indicia is created on a selected storage device. The at least two storage devices are scanned for the indicia during a subsequent runtime environment of the computer system after the first runtime environment.

20 Claims, 2 Drawing Sheets

34

36

DETERMINE THE CONFIGURATION OF THE STORAGE DEVICES

38

IDENTIFYING A SELECTED STORAGE DEVICE

40

CREATING AND INDICIA ON THE SELECTED STORAGE DEVICE

SELECTION OF BOOT DRIVE IN A COMPUTER SYSTEM

BACKGROUND

Selecting one of several disk drives in a computer system to be the system boot drive is an unreliable and inconsistent process. In many computer systems there may be two or more nonvolatile storage devices such as hard disk drives or solid state storage or partitions of either. One of these devices or partitions is generally more suited to be the boot drive and include an operating system than other devices or partitions. Frequently, the boot drive identified during booting differs from a boot drive identified after the operating system has assumed control of the computer system. After the boot drive is identified, the system can provision the boot drive to install or update an operating system, to configure an installed operating system, and to select a paging drive or a root drive. Difficulties arise when the system attempts to provision the boot drive and the system cannot determine the correct boot drive.

Prior solutions include filtering mechanisms in a random access memory (RAM) booted service operating system. The filtering mechanisms look at each mass storage device discovered by the operating system. These storage devices can be filtered by size, read-write capacity, local versus remote storage, and performance. The filtering mechanism can be used to select the storage device that is the largest and fastest read/write device that is local. The filtering mechanism removes the possibility of CD or DVD read or read/write drives, USB sticks, and SAN LUN drives from being included in the list of possible boot drives. This is often a suitable mechanism but it may not work correctly in cases when two or more storage devices include the same optimal criteria, and at times the mechanism selects the wrong storage device or may incorrectly eliminate a SAN LUN, or other storage device, from the list of possible candidates for the boot drive. No solutions appear to be more preferred than the "Guess your best" approach of the filtering mechanism.

At times, a user may be called upon to decide the boot drive. Often, operating systems can take a half-hour or so to install or otherwise provision. The user may not want to wait at the computer this entire time, yet the installation may require a user's input to select the install destination. Currently, many boot drive provisions require the input of the user.

The inconsistent, unreliable, and user assisted selection of a boot drive can be particularly troublesome in organizations that require or desire the same or similar operating system configuration. Such an organization can include many types of health care enterprises, which are required to maintain consistency throughout the computer systems. In such organizations, properly maintaining the operating systems or other computer programs can be costly and tedious.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1A:
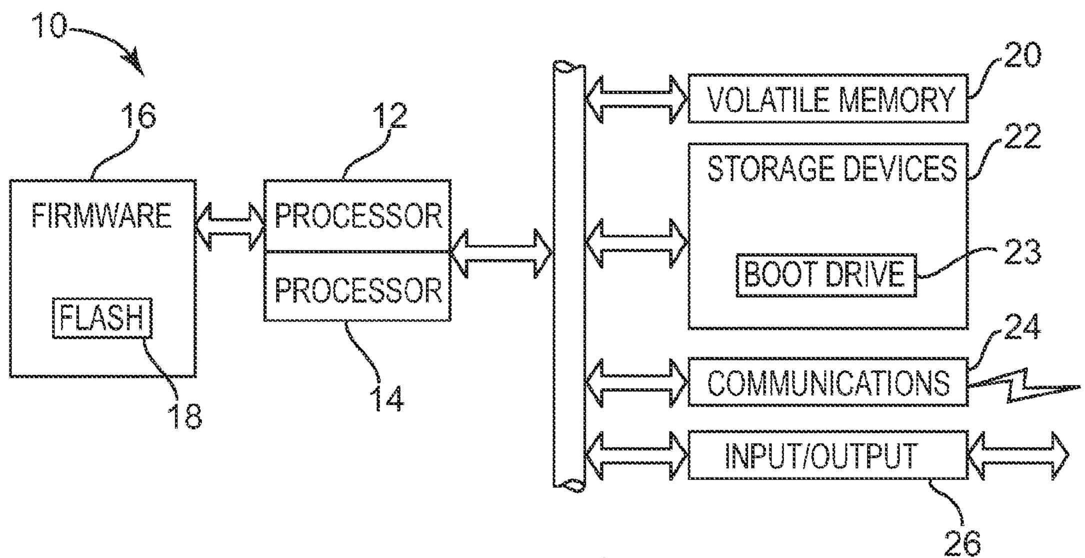
FIG. 1A is schematic drawing illustrating an example environment of the present disclosure.

FIG. 1A illustrates an example environment for the disclosure. The environment includes a computing system 10, such as a personal computer, a server, a handheld device, a video game console, or the like. The system 10 includes at least one processor 12, or additional processors, such as processor 14, and a firmware 16 associated with the processor 12. The firmware 16 can include a flash memory 18 for storing a system BIOS or the like. In one example, the processors 12, 14 and firmware 16 are together on the same motherboard. The system can also include components such as a volatile memory 20, storage devices 22, a communications device 24 to allow the system to communicate with another device or over a network of at least one other computer, and various input and output components 26. One of the storage devices 22 will be designated as the boot drive 23 in accordance with the present disclosure.

Figure 1B:
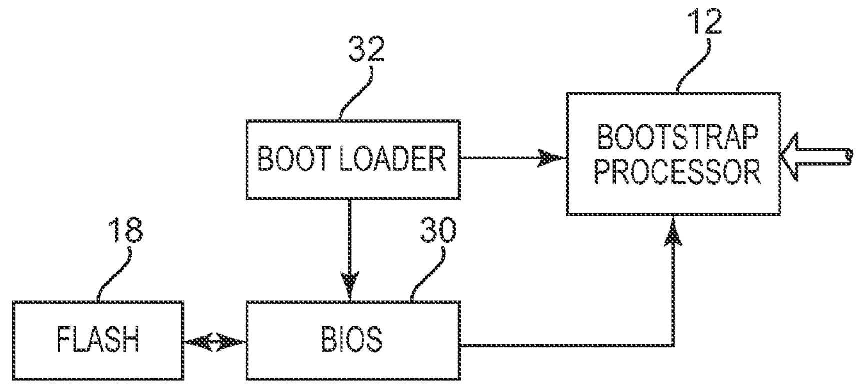
FIG. 1B is schematic drawing illustrating an example feature of the environment of FIG. 1A.

FIG. 1B illustrates a more detailed example of the firmware 16 in context with the processor 12. The firmware 16 includes the flash memory 18 coupled a system BIOS 30. The BIOS is also coupled to the processor 12. A boot loader 32 is also coupled to the processor 12 as well as the BIOS 30. The BIOS provides the first instructions to the processor 12 to begin operation of the computing device 10. It is often stored in the flash memory 18 or in another type of ROM (read only memory) on the mother board. In the present example, the BIOS 30 begins a central processor unit such as processor 12, although a computing system 10 can include a BIOS for a graphics processor and other system interfaces. The boot loader 32 (sometimes called a bootstrap loader) is a program which executes the BIOS 30 and other initial programs during these initial stages that permit other software to run and is completed when the system is turned over to an operating system.

The system 10 is started or restarted with a bootstrapping process, also known as booting or booting up. During booting, control of the computer can be considered to be in the control of the BIOS and boot loader 32. Booting can be considered a runtime environment of a sequence of runtime environments. Once the system has booted up, control is assumed by an operating system, which is another runtime environment in the sequence of runtime environments. Operating system control can be further divided into separate runtime environments, such as a service operating system assuming control after booting and then permitting a production operating system to take full control of the system 10.

Booting can occur in one of several ways including when the system 10 is powered up, when a reset signal is triggered, under a software controlled reboot, or otherwise. In one example, booting up begins the processor 12, which can be dynamically selected as the bootstrap processor over processor 14 in multiple processor systems. The bootstrap processor runs the system BIOS 30 (or the like) from the firmware 16, and it can run a kernel initialization code if applicable. In one example of a system boot up, the flash memory 18 can include a reset vector, or an address where the BIOS 30 can begin running a sequence of computer-executable instructions. The processor 12 and at least some parts of at least a few components 20-28 begin operating. The BIOS 30 often begins a self test. In the examples of this disclosure the BIOS and bootstrap loader 32 also begin a storage device selector process, which can be implemented as a computer-executable code.

Figure 2:
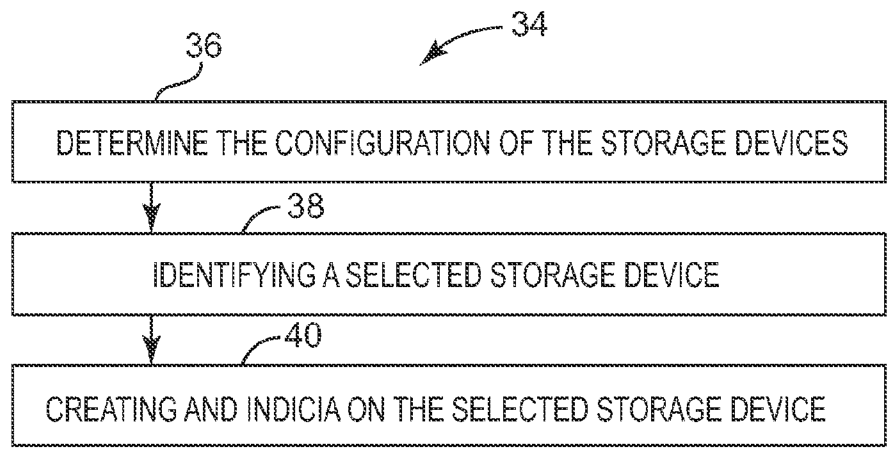
FIG. 2 is flow diagram illustrating an example process of the present disclosure.

FIG. 2 illustrates an example storage device selector process 34 that initiates in the boot loader, or the like. The boot loader probes the BIOS 30 to determine 36 the system configuration and particularly the configuration of the storage devices 22. The bootstrap loader identifies 38 a selected storage device from the storage devices 22 that should receive an operating system program to be deployed onto the computing system 10. The boot loader 32 creates 40 indicia on the selected storage device, which indicia is the indication that the selected storage device is the boot drive 23 where the operating system is to be deployed or provisioned. In this particular example, the process 34 is performed during the booting runtime environment and prior to a subsequent runtime environment where the operating system is in control of the computing system 10. Other examples are contemplated, and other runtime environments can include the capability to perform process 34.

The storage devices 22 can be configured in a number of ways. For example, the storage devices can include one or more of any combination of hard drives, optical drives, other drives such as tape drives, solid state memory, a storage area network (SAN), or a storage area network logical unit number (SAN LUN), further partitions of storage devices, or other suitable devices, system, or logic that can receive an applicable operating system. The BIOS 30 includes data regarding the configuration of the storage devices 22 in a manner which can be read by the boot loader 32, such as in the flash memory 18.

The process of identifying the selected portion of the storage device 22 should receive an operating system program involves determining a selected storage device from the available storage devices 22. This can be done in any one or more of a number of ways. Methods can include storing in the BIOS 30 a predetermined storage medium. Another method can including selecting from a list of pre-designated available storage mediums such as solid state storage, internal hard drives, and SAN LUN. This list can exclude items such as optical drives or external storage. Another method includes applying an algorithm to determine the fastest read/write storage medium in view of an appropriate size of the storage medium or other factors, and so on. In cases where one storage device is not clearly more appropriate than another, the method can select a storage device at random. Once identified, the selected storage device can be designated as the boot drive 23 (regardless of whether the selected storage device is in fact a drive mechanism).

Once a boot drive 23 is identified 38, the boot loader 32 creates an indicia on the boot drive 23. This indicia can be a number of markings, either physical such as on the boot drive itself or virtual such as a pointer stored in a memory. One preferred example of physical indicia is a watermark on the drive itself at a variable location on the drive. A watermark is a reliable method of writing the indicia and later determining with great certainty the watermark when it is read.

This process 34 is performed automatically, such as without a user input. Thus the process 34 can be used in cases where no user is available and with disregard for a user input in cases where a user is available. Someone such as a system administrator can automatically install an operating system or configure the boot drive without having to consult with the user or without the user's help.

Figure 3:
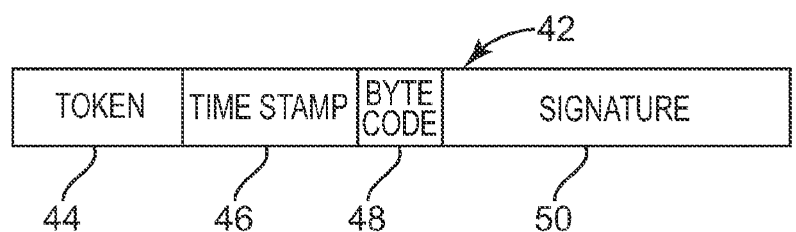
FIG. 3 is a block diagram illustrating an example feature created by the example process of FIG. 2.

FIG. 3 illustrates an example watermark 42 suitable for use in the present disclosure. In this example, the watermark 42 includes a token 44, a timestamp 46, a byte code 48, and a signature 50. In this example, the boot loader 32 determines a region on the boot drive that can serve as a candidate for the watermark 42. In the case of a disk drive, the candidate region can include a 63 kB to 200 kB sector space. The candidate region of the example includes thirty-two continuous bytes, or byte block, where every byte is the same for all thirty-two bytes. For example, a byte of 00 to ff (or any one of 256 combinations of bits) is repeated thirty-two times in the byte block. This byte of 00 to ff can be called the repeated byte. The candidate region defines the location for storing the watermark.

In the example, the first sixteen bytes include the region for storing the token, the time stamp and the byte code. For example, the token 44 can include seven bytes of the watermark 42, which can include a representation such as "HPC-Mark," or the like. The timestamp 46 can include an eight byte representation of the time and date that the watermark 42 was written. The byte code can be one byte and represent the repeated byte (from 00 to ff). The remaining sixteen bytes are used for signature, which can be a verification of the first sixteen bytes. For example, the last sixteen bytes can be a computed checksum of the first sixteen bytes. The sixteen byte checksum is a signature type that is durable in generating a unique key, such as an MD5 code or the like.

Figure 4:
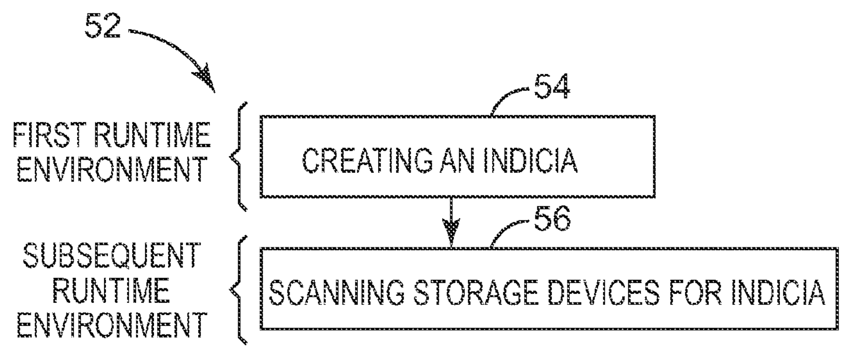
FIG. 4 is a flow diagram illustrating an example process of the present disclosure, which can include the process of FIG. 2.

FIG. 4 illustrates an example process 52 for identifying the boot drive 23. The process includes creating 54 the indicia on the selected storage device during a first runtime environment of the computing system 10. The first runtime environment can include booting or a subsequent runtime environment. Once the first runtime environment is complete and a subsequent runtime environment receives control of the computing system, the storage devices 22 are scanned for the indicia 56.

In one example, creating the indicia during the booting of the computer system 10 includes the process described above. The first runtime environment in the example is the booting. The subsequent runtime environment in the example is the operating environment, or after booting is completed. The operating environment includes the tools and code necessary to scan for the indicia written during booting to determine the boot drive 23 selected during booting. In one example, any runtime environment subsequent the booting includes the ability to detect the selected storage device marked with the indicia as the boot drive 23.

Once the boot drive 23 is identified, the selected storage device can be targeted for partitioning, operating installation, paging drive selection, root drive selection, proper installation and configuration of an installed operating system, or other configuration of the boot drive.

Figure 5:
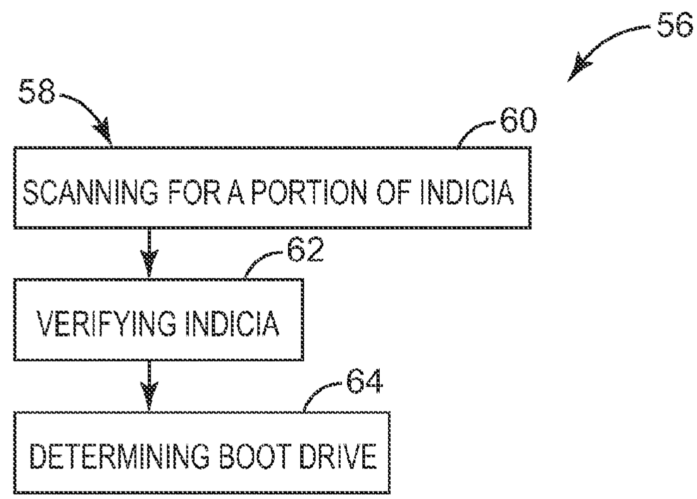
FIG. 5 is a flow diagram illustrating an example process, which can be included as a feature of the process of FIG. 4.

FIG. 5 illustrates an example process 58 for scanning the storage devices 22 for the indicia. The storage devices 22 are scanned 60 for a portion of the indicia indicating likelihood that it is the indicia. Also, the indicia is verified 62. In the case of the example watermark 42 above, the storage devices are scanned for the token 44. Once the token 42 is found, the remaining portion of the byte block is read to determine if the token is part of the watermark 42. Once the indicia is verified, the operating system determines that the storage device with the indicia is the boot drive 23. For example, the operating system includes the ability to find the indicia, decode the indicia, and to identify the storage device including the indicia as the boot drive 23.

In one example, the indicia need not remain on the boot drive 23 for very long. In general, the life of the indicia need only be from booting to operating environment. After booting, the operating system stores the location of the boot drive, and the indicia can be overwritten. There are circumstances, however, when the indicia cannot be overwritten prior to the next booting or creation of the next indicia. Such circumstances can include a power failure before the indicia can be found, or the like. In these circumstances, the storage devices 22 may include two or more indicia, which includes one or more orphaned indicia in addition to the correct indicia. To account for the multiple indicia, the process 58 scans all of the candidate portions of the storages devices 22, and selects the most recently written indicia.

In the example of the watermark 42, the time stamp includes the information of when the watermark 42 was written, and this can be compared to any other watermarks 42 discovered on the storage devices, and the process selects the storage device with the most recently written watermark 42 as the boot drive 23.

An additional feature of this process 58 can include writing over the indicia after it is discovered and the boot drive 23 is identified. In one example, the process includes writing over the indicia with the data previously included on the candidate region. In connection with this, the indicia can include a representation of the data that was in the byte block prior to the creation of the indicia on the boot drive 23. In the watermark 42, the byte code includes the repeated byte repeated in each of the 32 bytes prior to the watermark 42. This overwriting, or cleaning of the storage media from the watermark, can be performed in any runtime environment.

In one example, the above-described processes are performed each time the system 10 is booted up. The system 10 can support sequences of many service boots, and each of these boots can advance the pre-operating environment configuration of the system 10. For example, configuration changes can include BIOS flashes, setting up SAN connections or additional drives, and the like. With each of these changes, the actual boot drive 23 may change. When the process is performed each time the system boots up, the changes can be identified and the location of the boot drive 23 can be changed according to the new configuration.

The present disclosure provides for a reliable, consistent, and accurate selection of the boot drive 23. In addition, the watermark 42 can be quickly written, quickly detected, and quickly overwritten. The boot drive 23 can be provisioned remotely, such as through the communication device 24.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A process for designating a boot drive in a computing system, the process comprising,
- determining a configuration of storage devices available to the computing system;
- identifying a selected storage device from the storage devices available to the computing system; and
- creating, during a first runtime, an indicia on the selected storage device configured to indicate the selected storage device is a destination for provisioning of an operating system such that scanning the configuration of storage devices for the indicia during a runtime subsequent to the first runtime identifies the selected storage device as the destination for provisioning of the operating system.

2. The process of claim 1 wherein determining the configuration includes probing a system BIOS to determine a system configuration, wherein the system configuration includes a configuration of the storage devices.

3. The process of claim 2 wherein the probing is performed with a boot loader during the booting of the computing system.

4. The process of claim 3 wherein process is completed prior to an operating environment.

5. The process of claim 1 wherein identifying the selected storage device includes selecting an appropriate storage device suitable as a boot drive based on predetermined factors.

6. The process of claim 5 wherein the selected storage drive is randomly selected from two or more appropriate storage devices.

7. The process of claim 1 wherein the creating the indicia includes physically marking the selected storage device.

8. The process of claim 7 wherein physically marking the selected storage device includes logically writing to the selected storage device.

9. The process of claim 8 wherein the indicia includes a watermark on the selected storage drive.

10. The process of claim 9 wherein the watermark includes a token, time stamp, byte code, and a signature.

11. A process for identifying a boot drive during a plurality of runtime environments of a computing system, the process comprising:
- creating an indicia on a selected storage device during a first runtime environment of the computing system; and
- scanning a plurality of storage devices including the selected storage device for the indicia during a subsequent runtime environment of the computing system after the first runtime environment.

12. The process of claim 11 wherein creating the indicia includes writing a machine readable code on the storage device.

13. The process of claim 11 wherein the first runtime environment includes booting up.

14. The process of claim 13 wherein the subsequent runtime environment includes an operating environment.

15. The process of claim 14 wherein the operating environment includes one of a service environment or a production environment.

16. The process of claim 11 wherein scanning includes scanning the storage devices for indicia, verifying the indicia, selecting the most recently created indicia.

17. The process of claim 11 and further comprising writing over the indicia.

18. The process of claim 17 wherein the indicia includes a representation of the data to be written over the indicia.

19. A computing system, comprising:

a processor;

a system firmware operably coupled to the processor and configured to boot up the computing system;

a plurality of storage devices operably coupled to the processor, wherein at least one of the storage devices includes an operating system and wherein one of the storage devices is intended to be a boot drive;

wherein the computing system is configured to use the system firmware and the processor to create an indicia on a selected storage device during a first runtime environment of the computing system; and wherein the computing system is configured to use the operating system and the processor to scan the plurality of storage devices for the indicia during a subsequent runtime environment of the computer system after the first runtime environment.

20. The computing system of claim 19 wherein the indicia is a machine readable code on the boot drive including a token, timestamp, byte code, and a signature.

* * * * *